United States Patent
Desautard et al.

(10) Patent No.: US 11,736,185 B2
(45) Date of Patent: Aug. 22, 2023

(54) SYSTEM AND METHOD FOR A FLYING MACHINE FOR RECEIVING AND MANAGING SATELLITE SIGNALS

(71) Applicant: Airbus (S.A.S.), Blagnac (FR)

(72) Inventors: Romain Desautard, Blagnac (FR); Wolfgang Fischer, Taufkirchen (DE); Leslie Smith, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 72 days.

(21) Appl. No.: 17/548,834

(22) Filed: Dec. 13, 2021

(65) Prior Publication Data

US 2022/0173802 A1  Jun. 2, 2022

Related U.S. Application Data

(63) Continuation of application No. PCT/EP2020/065950, filed on Jun. 9, 2020.

(30) Foreign Application Priority Data

Jun. 13, 2019  (FR) ...................................... 1906333

(51) Int. Cl.
*H04B 7/185* (2006.01)
*H04B 7/06* (2006.01)

(52) U.S. Cl.
CPC ....... *H04B 7/18539* (2013.01); *H04B 7/0602* (2013.01); *H04B 7/0632* (2013.01); *H04B 7/18563* (2013.01)

(58) Field of Classification Search
CPC ................ H04B 7/0602; H04B 7/0632; H04B 7/18539; H04B 7/18563

USPC ......................................................... 375/262
See application file for complete search history.

(56) References Cited

U.S. PATENT DOCUMENTS

| 5,341,301 A | * | 8/1994 | Shirai | ..................... | H04B 7/082 |
| | | | | | 701/470 |
| 10,128,931 B2 | | 11/2018 | Rothaar et al. | | |
| 2002/0073437 A1 | | 6/2002 | Chang et al. | | |
| 2019/0036224 A1 | * | 1/2019 | McCollough | .......... | H01Q 5/321 |
| 2020/0259250 A1 | * | 8/2020 | Diamond | ............. | H01Q 21/06 |

FOREIGN PATENT DOCUMENTS

FR 2 793 631 A1 11/2000
WO WO 02/15582 A1 2/2002

OTHER PUBLICATIONS

International Search Report and Written Opinion for Application No. PCT/EP2020/065950 dated Jul. 27, 2020.

* cited by examiner

*Primary Examiner* — Leila Malek
(74) *Attorney, Agent, or Firm* — KDW Firm PLLC

(57) ABSTRACT

A system includes antennas to receive satellite signals, modems for managing data received from the antennas, and a switching unit for managing the allocation and the transmission of the data from the various antennas to the various modems, the data from any one of the antennas being able to be allocated and transmitted to any one of the modems, the system thus being able to adapt the allocation of the data such that each modem is able to continue to receive data relating to signals transmitted by one and the same satellite upon a change of position of the antennas, thereby making it possible to maintain communication to one or more given satellite communication services.

15 Claims, 5 Drawing Sheets

SYSTEM AND METHOD FOR A FLYING MACHINE FOR RECEIVING AND MANAGING SATELLITE SIGNALS

CROSS-REFERENCE TO RELATED APPLICATIONS

This application is a continuation application from and claims priority to International Patent Application No. PCT/EP2020/065950, filed on Jun. 9, 2020, which claims priority to French patent application No. 1906333 filed on Jun. 13, 2019, the disclosures of both of which are incorporated by reference herein in their entireties.

TECHNICAL FIELD

The disclosure herein relates to a system and a method, intended for a flying machine, in particular a transport plane, for receiving and managing satellite signals, and to a flying machine provided with such a system.

BACKGROUND

The disclosure herein relates to communication between a flying machine and satellites.

It is known that high-speed connectivity of aircraft, in particular transport planes, to satellites is more often than not based on a directional antenna. This antenna is oriented electromechanically and it is mounted on the upper part of the fuselage of the aircraft underneath a radome. This radome forms a protrusion that severely impacts the aerodynamic performance of the aircraft. Moreover, the directivity of the antenna makes it possible to establish a link with just one satellite at a time, thereby leading to service interruptions when handing over from one satellite to another.

To limit aerodynamic impact, it is possible to replace the electromechanical directional antenna with a flat electronic-pointing antenna. However, such a solution makes it possible to cover a solid angle only of +/−75 degrees with respect to the perpendicular of the plane of the antenna. Some satellites therefore risk being outside of the field of coverage of the antenna when the aircraft is located at high latitudes or is simply currently maneuvering.

To improve the quality of the link, U.S. Pat. No. 10,128,931 makes provision to combine a plurality of antennas on a single modem for one and the same satellite constellation. That patent describes a system in which the signals received by a plurality of antennas are added together so as to improve the quality of the link, and which comprises a selector for choosing the antenna with the best signal quality for transmission.

However, the system described in that patent does not provide any solution for maintaining a plurality of connections to various satellite communication services in parallel upon movements of the flying machine.

SUMMARY

An aim of the disclosure herein is to rectify this drawback. It relates to a system, intended for a flying machine, for receiving and managing satellite signals, the system comprising a plurality of antennas, each of the antennas being able to receive signals from a satellite.

According to the disclosure herein, the system additionally comprises:

a plurality of modems, each of the modems being configured so as to manage data received from at least one antenna, the data being representative of signals received by the antenna;

a switching unit able to be controlled and configured so as to manage, in real time, on the basis of its command, at least the allocation and the transmission of the data from the various antennas to the various modems, the data from any one of the antennas being able to be allocated and transmitted to any one of the modems, the allocation of the data from the various antennas to the various modems depending at least on current positions of the antennas and on satellite position information.

Thus, by virtue of the disclosure herein, the system is able to adapt, in real time, the allocation and the transmission of the data from the various antennas to the various modems, such that each modem is able to continue to receive data relating to signals transmitted by one and the same satellite (or one and the same satellite constellation) with which it is communicating when the current positions of the antennas change (which positions may vary while the flying machine is moving in space). This makes it possible to maintain communication to a given satellite communication service. Since the system additionally comprises a plurality of antennas and a plurality of modems, it is able to maintain, where applicable, simultaneous communication to a plurality of different services while the flying machine is moving, as explained below.

In a first embodiment, the system comprises a control unit configured so as to control the switching unit. The control unit is preferably configured so as to control the switching unit on the basis at least of the location of the antennas on the flying machine, of current flight parameters of the flying machine and of data from a satellite database comprising at least the satellite positioning information.

Furthermore, in a second embodiment, the system is configured so as to control the switching unit collaboratively.

Advantageously, the switching unit is configured so as to be able to transmit, to just one and the same modem, the data from a plurality of antennas receiving signals from one and the same satellite or from satellites of one and the same satellite constellation via a module that sums these data.

Moreover, in one preferred embodiment, the system comprises a plurality of modulation and demodulation functions adapted to each of the satellites or satellite constellations with which the system has to be able to communicate, and at least one allocation management element configured so as to allocate one of the modulation and demodulation functions to each of the antennas, allowing it to communicate with one of the satellites or one of the satellite constellations adapted to the thus-allocated modulation and demodulation function.

Preferably, the management element forms part of the control unit.

In a first embodiment, the management element is configured, upon a change of allocation of modulation and demodulation function to an antenna, so as to reconfigure the antenna for a new modulation and demodulation function.

Furthermore, in a second embodiment, the management element is configured, upon a change of allocation of modulation and demodulation function to an antenna, so as to notify this change to the modem intended to receive the data from this antenna, the modem being configured so as to reconfigure the antenna for a new modulation and demodulation function.

The disclosure herein also relates to a method for receiving and managing satellite signals, using a system such as that described above, the method comprising a first set of steps, implemented by the antennas of the system, consisting in or comprising receiving satellite signals.

According to the disclosure herein, the method additionally comprises:
- at least one management step consisting in or comprising managing, in real time, at least the allocation and the transmission of data from the various antennas to the various modems of the system, the data from an antenna being representative of signals received by this antenna, the data from any one of the antennas being able to be allocated and transmitted to any one of the modems, the allocation of the data from the various antennas to the various modems depending at least on current positions of he antennas and on satellite position information; and
- a second set of steps, implemented by the modems of the system, consisting in or comprising managing the received data.

Advantageously, the management step consists in or comprises adapting, in real time, the allocation and the transmission of the data from the various antennas to the various modems such that, while the flying machine is moving, each modem always receives data relating to signals transmitted by one and the same satellite or one and the same satellite constellation with which it is communicating.

Furthermore, advantageously, the management step consists in or comprises allocating a modulation and demodulation function to each of the antennas, allowing it to communicate with one of the satellites or one of the satellite constellations, adapted to the thus-allocated modulation and demodulation function.

The disclosure herein furthermore relates to a flying machine, in particular an airplane, that comprises a system such as that described above.

Advantageously, the system comprises a plurality of antennas arranged on the flying machine so as to generate together an overall coverage of 360° azimuth and at least between −20° and +90° elevation.

Moreover, in an embodiment, the flying machine is an airplane, and at least one of the antennas of the system is arranged on one of the following elements of the airplane:
- a wing;
- the tail fin;
- a horizontal tan;
- a wing-tip winglet;
- the fuselage.

BRIEF DESCRIPTION OF THE DRAWINGS

The appended figures will make it easy to understand how the disclosure herein may be implemented. In these figures, identical references denote similar elements.

DETAILED DESCRIPTION

Figure 1:
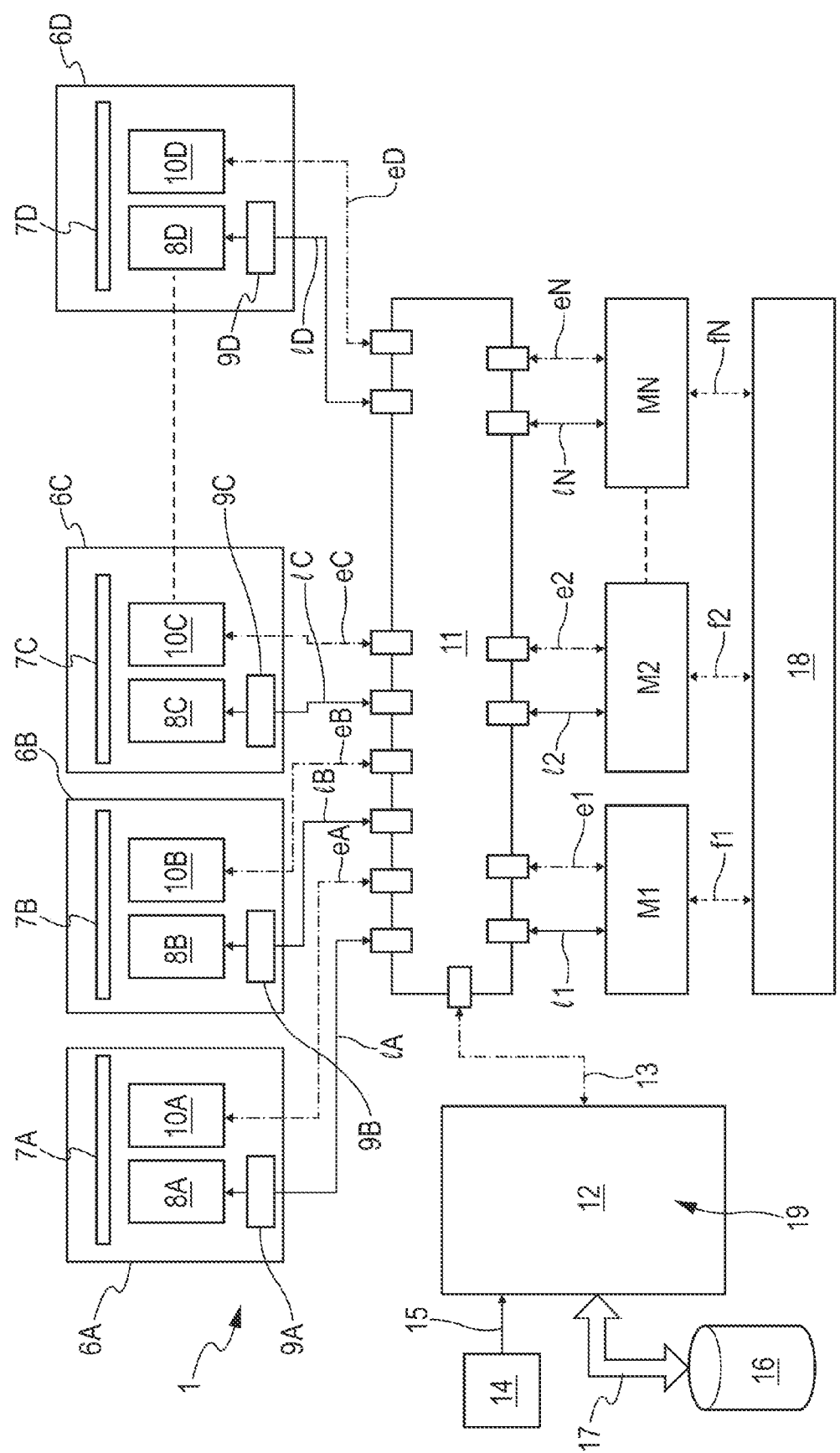
FIG. 1 is an overview of one particular embodiment of a system for receiving and managing satellite signals.

The system 1 shown schematically in FIG. 1 is a system for receiving and managing satellite signals automatically and in real time.

The satellites taken into consideration in the context of the disclosure herein may be of different (conventional) types. They may in particular be satellites and/or satellite constellations located at different orbits, and in particular:
- low Earth orbit (LEO) satellites, such as satellites S1A, S1B, S1C, S1D and S1E of a constellation 2 shown in FIGS. 2 to 4;
- geostationary Earth orbit (GEO) satellites, such as a satellite S2 in FIGS. 2 to 4;
- medium Earth orbit (MEO) satellites.

The system 1 is mounted on a flying machine 3, as explained below with reference to FIGS. 2 to 4 in particular, There is at present an increase in the number of services offered via satellites or satellite constellations on various orbits. some of which may be used on the flying machine 3. In one preferred application, described below with reference to FIG. 5, the flying machine 3 is a transport plane 4.

Figure 2:
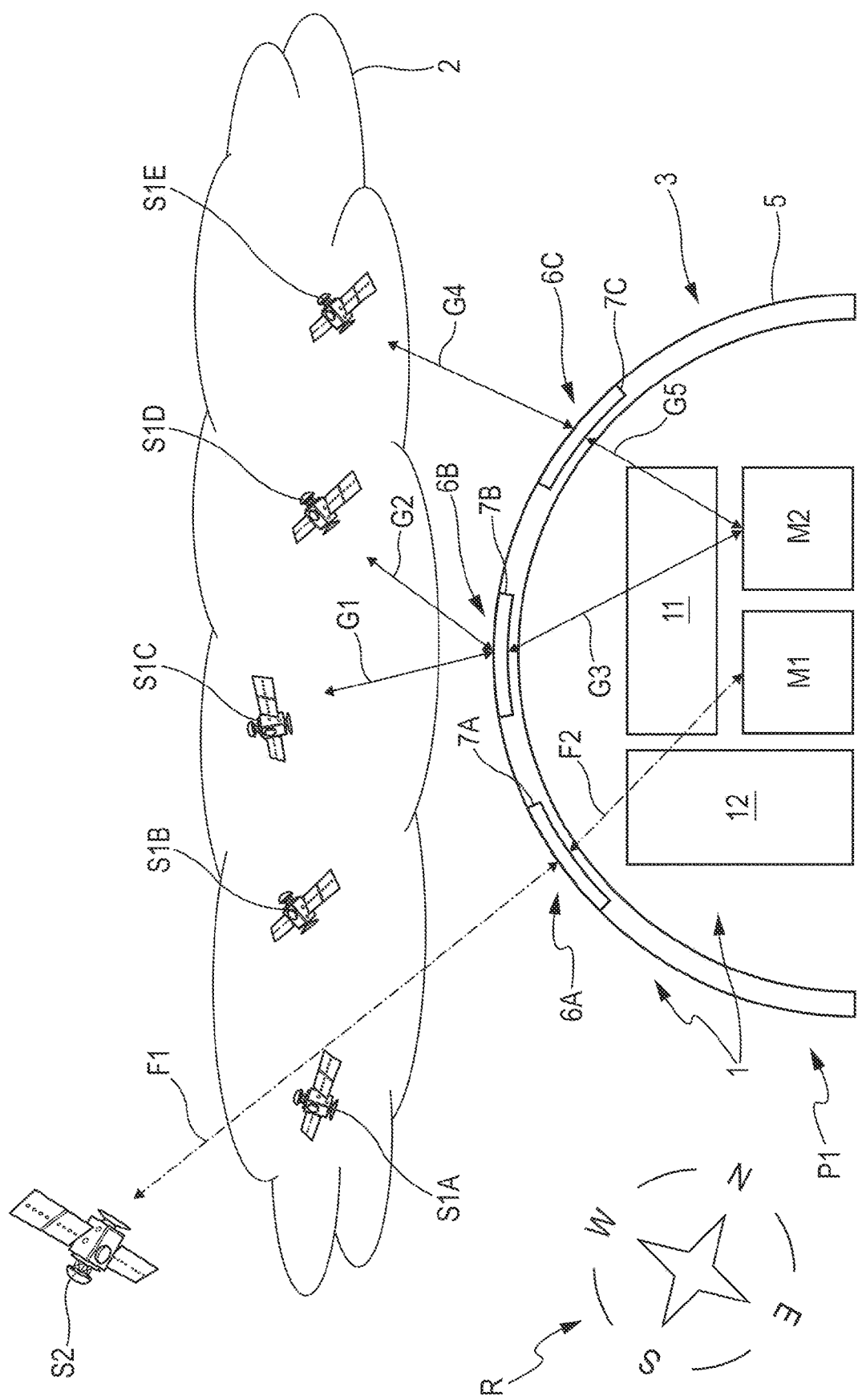
FIG. 2 is a partial schematic view of part of such a system mounted on a flying machine, for a first position of the flying machine with respect to some satellites.

As is conventional, as shown schematically in FIGS. 1 and 2 in particular, the system 1 comprises a plurality of antennas 6, distinguished by references 6A, 6B, 6C and 6D, each of the antennas 6A, 6B, 6C and 6D being able to receive signals from a satellite S1A to S1E, S2.

The antennas 6 of the system 1 may be of various conventional types. In one preferred embodiment, at least some of the antennas 6 are active electronic beamforming arrays the pointing of which is able to be controlled, Simpler antenna configurations using passive elements or with mechanical pointing may also be used.

The system 1 may therefore in particular comprise:
- electronic-pointing antennas; and/or
- mechanical-pointing antennas; and/or
- passive antennas.

In one preferred embodiment, an antenna 6 comprises an antenna element (specifically an element for transmitting and receiving radio signals) along with other elements (or peripherals) that are associated with this antenna element, such as a reception and transmission gain amplifier and/or an intermediate frequency converter. In the context of the disclosure herein, "antenna" is understood to mean the whole system formed by the antenna element and the various peripherals that are linked to this antenna element.

In the particular embodiment shown in FIG. 1, each of the antennas 6A, 6B, 6C and 6D is preferably an electronic-pointing antenna, and it comprises:
- an antenna element 7A, 7B, 7C, 7D;
- an analogue signal processing unit 8A, 8B, 8C, 8D, performing filtering operations and amplifications;
- an analogue to digital conversion unit 9A, 9B, 9C, 9D (of "ADC/DAC" type or of "IQ packetization/depacketization" type); and
- a module 10A, 10B, 10C, 10D for managing the antenna element 7A, 7B, 7C, 7D. This module may be integrated into the rest of the antenna or be arranged nearby.

Each of the antennas 6A, 6B, 6C and 6D of the system 1 is able to receive signals from a satellite or from a plurality of satellites of one and the same satellite constellation.

The system 1 additionally comprises, as shown in FIG. 1:
a plurality of modems M1, M2, . . . MN, N being an integer. Each of the modems M1 to MN is configured so as to manage data received from at least one antenna 6A to 6D of the system 1. The data received by a modem from an antenna are representative (as is conventional) of signals received by this antenna, after processing thereof; and
a switching unit 11 able to be controlled, as explained below. This switching unit 11 is configured so as to manage, in real time, on the basis of received commands (explained below), at least the allocation and the transmission of the data from the various antennas 6A to 6D to the various modems M1 to MN. The switching unit 11 is able to allocate and transmit the data from any one of the antennas 6A to 6D to any one of the modems M1 to MN, on the basis of its command. Each of the modems M1 to MN is able to receive data from at least one antenna 6A to 6D.

The allocation of the data from the various antennas 6A to 6D to the various modems M1 to MN depends at least on current positions of the antennas 6A to 6D and on satellite position information, as explained below.

In a first embodiment shown in FIG. 1, the system 1 comprises a control unit 12 configured so as to control the switching unit 11 by way of a link 13.

Figure 3:
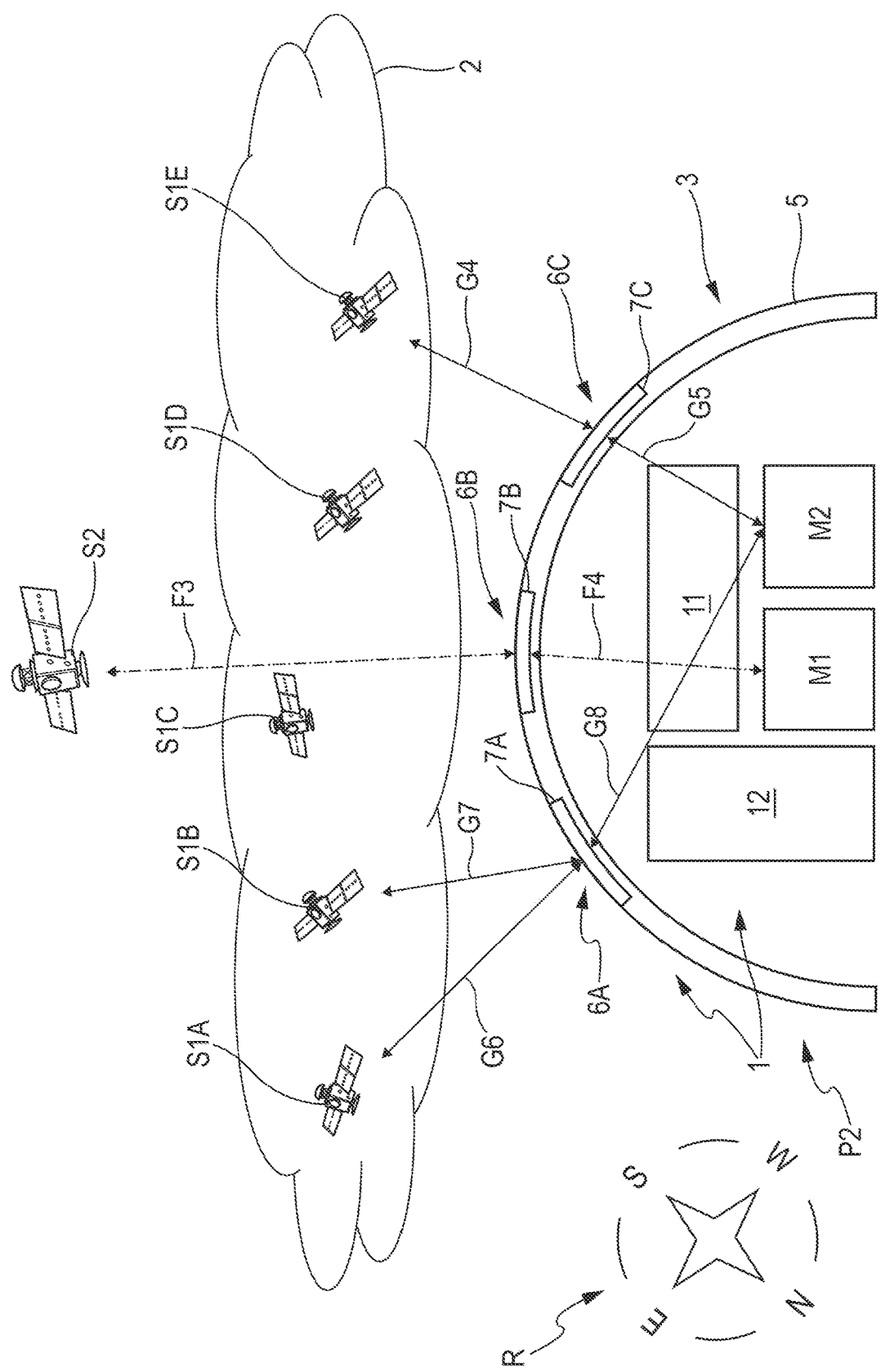
FIG. 3 is similar to that of FIG. 2, for a second position of the flying machine with respect to the satellites.
Figure 4:
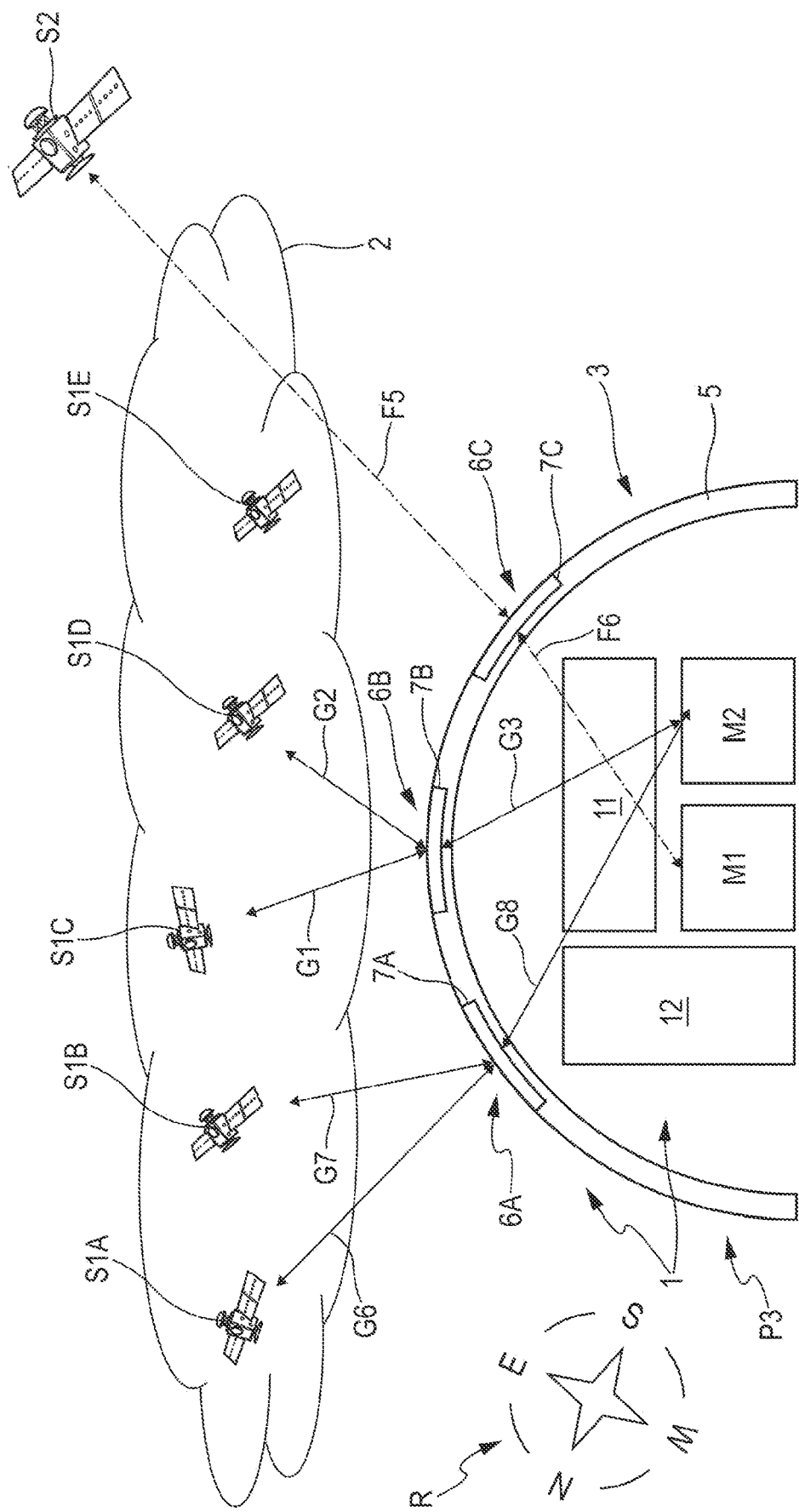
FIG. 4 is similar to that of FIGS. 2 and 3, for a third position of the flying machine with respect to the satellites.

The control unit 12 is configured so as to control the switching unit 11 on the basis:
at least of the location of the antennas on the flying machine 3, as shown in FIGS. 2 to 4, where the antenna elements 7A 7B and 7C are arranged on an external structure 5 of the flying machine 3, in particular its fuselage. This location (position and orientation) may for example be recorded in a memory (not shown) of the control unit 12;
current values of flight parameters of the flying machine 3, received for example from a parameter generation unit 14 (explained below) via a link 15. Based on these current values of flight parameters, in particular the position and the attitude (or orientation in space) of the flying machine 3, and using the (known) location of the antenna elements 6A, 6B and 6C on the flying machine 3 and their characteristics, the control unit 12 is able to determine the current orientation (or line of sight) of each of the antennas; and
data from a satellite database 16 comprising at least the satellite position information. The satellite database 16 is connected to the control unit 12 by way of a link 17.

Based on the orientation (or line of sight) of the antennas in space and the positions in space of the satellites with which the system 1 wishes to communicate, the control unit 12 is able to determine which antenna is able to receive the signals from a given satellite in an appropriate manner, and thus control the switching unit 11 so that it allocates the data from this antenna to the modem that manages the service relating to this given satellite.

In an embodiment, if the future position and the future attitude of the flying machine 3 are known, the control unit 12 may also use this (predictive) information to manage the allocation, for example to anticipate a change of satellite due to the upcoming loss of the satellite being used at the current time.

The position and the attitude of the flying machine 3 may be obtained in various ways. In particular:
in a first embodiment, the parameter generation unit 14 comprises conventional devices of the flying machine 3 that transmit the current values via avionic buses (link 15), for example of "AFDX" type. The conventional devices may comprise an MMR (for "multi-mode receiver") radio navigation receiver, and/or an air data and inertial reference unit (ADIRU) and/or a flight management system (FMS) for predictive information; and
in a second embodiment, the parameter generation unit 14 is an independent assembly (specially dedicated or not specially dedicated to the system 1) comprising an inertial reference system and a GPS positioning system and possibly a barometer. Such an assembly may for example be integrated into at least some of the antennas.

In the example of FIG. 1, the antennas 6A to 6D and the modems M1 and MN are connected:
to ports of the switching unit by way of links IA to ID and 11, 12 and IN intended to transmit data; and
to ports of the switching unit 11 by way of links eA to eD and e1, e2 and eN intended to transmit control orders (for example to control the orientation of the antennas if they are electronic-pointing antennas).

The results of the processing operations performed by the modems M1, M2 and MN, in particular on the received data, may be transmitted to user devices (not shown) of the flying machine. To this end, the system 1 of FIG. 1 comprises a router 18 that is connected to the modems M1, M2 and MN, respectively, by way of links f1, f2 and fN (Ethernet).

Furthermore, in a second embodiment (not shown), the system 1 is configured so as to control the switching unit 11 collaboratively or in a negotiated or distributed manner (for example using inter-modem distributed negotiation algorithms). In particular, the antennas and the modems of the system 1 are configured so as to collaboratively control the switching unit, that is to say the allocation and the transmission of the data from the various antennas to the various modems. In this second embodiment, provision is made for algorithms for managing the configuration of the switching unit 11 that are decentralized and negotiated between various elements of the system 1, specifically the modems and the antennas.

As a variant, other collaborative or distributed methods may also be contemplated, for example through negotiation between the various modems, by managing predefined or dynamically established priorities, or via any other quality of service concept.

In the context of the disclosure herein, the data switching mechanism (implemented by the switching unit) may be implemented either on the analogue level or on flows that are already digitized, either in baseband or at an intermediate frequency.

The system 1 is thus able to adapt, in real time, the allocation and the transmission of the data from the various antennas to the various modems, such that each modem is able to continue to receive data relating to signals transmitted by one and the same satellite (or one and the same satellite constellation) with which it is communicating, and to do so in particular when the current positions of the antennas change (which positions may vary while the flying machine 3 is moving in space). This management makes it possible to maintain communication to a given satellite communication service. Since the system 1 additionally comprises a plurality of antennas 6A and 6D and a plurality of modems M1 to MN, it is able to maintain, where applicable, simultaneous communication to a plurality of different services while the flying machine 3 is moving, as explained below with reference to FIGS. 2 to 4.

In order to be able to communicate with a satellite, an antenna has to implement an appropriate modulation and demodulation function. As is conventional, the modulation and demodulation functions required to communicate with a satellite may differ from one satellite to another, from one (satellite) constellation to another, or from one operator to another.

In order to allow multiple communication between the flying machine 3 equipped with the system 1 and various satellites (or various satellite constellations), the system 1 therefore has to have the modulation and demodulation function required for each satellite (or satellite constellation) with which it wishes to communicate. To communicate with certain satellites, it is necessary to use a given frequency and a given polarization. There may also be a need to set a certain skew angle along with a channel (frequency setting) and amplification values.

Therefore, in one preferred embodiment, the system 1 comprises a plurality of modulation and demodulation functions adapted to each of the satellites or satellite constellations with which the system 1 has to be able to communicate. The system 1 additionally comprises at least one (allocation) management element 19 configured so as to allocate one of the modulation and demodulation functions to each of the antennas of the system 1 in order to allow each antenna to communicate with one of the satellites (or one of the satellite constellations) adapted to the thus-allocated modulation and demodulation function.

In a preferred embodiment, the management element 19 forms part of the control unit 12 (FIG. 1).

In a first embodiment, the management element 19 is configured, upon a change of allocation (of modulation and demodulation function) to an antenna, so as to directly reconfigure the antenna for a new modulation and demodulation function under consideration. The antenna command, implemented by the management element 19 and more generally by the control unit 12, may comprise the following operations: adjusting frequency, controlling polarization, authorizing a transmission, pointing the antenna in a given direction, etc.

Furthermore, in a second embodiment, the management element 19 is configured, upon a change of allocation (of modulation and demodulation function) to an antenna, so as to notify this change to the modem intended to receive the data from this antenna, the modem being configured so as to reconfigure the antenna for the new modulation and demodulation function under consideration.

In the context of the disclosure herein, the controlling of the antennas for the pointing, the management of the frequencies (in baseband and at intermediate frequency) and the polarization may be managed directly by the control unit 12, or else left to the modems and switched by the switching unit 11. In addition, the beamforming for each antenna may be determined in the modem M1, M2, MN, in the antenna element management module 10A to 10D, or in the control unit 12.

The system 1 therefore provides information communication in both directions, from the antennas to the modems (in receive mode) and from the modems to the antennas (in transmit mode), The embodiment of FIG. 1 presents one example of digital switching for the system 1. The system 1 of FIG. 1 shows one possible embodiment using digitized flows ("packetized IQ samples") that are transmitted between the modems and the antennas by the switching unit, representing a digital switch. A high-speed Ethernet switch may also be used.

The radiofrequency signal is digitized by the unit 9A, 9B, 9C, 9D for reception and by the modem M1, M2, MN for transmission. The modems and the units 9A, 9B, 9C, 9D exchange packetized IQ samples via the switching unit 11. The control unit 12 controls the switching unit 11 so as to transmit these packets between an antenna and a modem. The antenna used by a modem may change over time. It is possible to combine a plurality of antennas for a single modem, for example by providing a combination element that sums the signals in the digital domain and that implements a phase synchronization on the signals, In this embodiment, the switching unit 11 may:
switch the IQ samples and the control orders; or
switch only the IQ samples, a regular Ethernet switch then being able to be used for the control orders.

The architecture shown by way of example in FIG. 1 therefore uses a digital switch. As a variant, in the context of the disclosure herein, it is also possible to provide an architecture that is similar but that uses at least one separate Ethernet switch for the control orders and/or an analogue matrix to select the antenna that is connected to a given signal. This embodiment has an advantage in that it is compatible with existing modems with interfaces in the L band. One example of managing and transmitting data as implemented by the system 1 is presented below with reference to FIGS. 2 to 4.

In this example, each of the modems M1 and M2 under consideration manages a different service. More particularly, the modem M1 is used to establish a connection to the satellite S2 of a geostationary constellation, and the modem M2 is used to establish connections to various satellites S1A S1B, S1C, S1D and S1E of the low Earth orbit constellation 2.

FIGS. 2 to 4 show a compass R indicating the cardinal points: North (N), South (S), East (E), and West (W). The position of the flying machine 3 with respect to this compass R makes it possible to highlight the attitude of the flying machine 3 and also the position and the orientation of the antenna elements 7A, 7B and 7C that are used.

Since the flying machine 3 is currently banking, the switching unit 11 is controlled so as to always allocate data relating to the signals transmitted by the satellite S2 to the modem M1 and to use, in order to communicate with the satellite S2, an antenna that makes it possible to maintain a line of sight. More particularly:
in position P1 (in space) of the flying machine 3 in FIG. 2, the antenna 6A has a direct line of sight to the satellite 32 in order to generate a link between the satellite S2 and the modem M1, as illustrated by arrows F1 and F2;
in subsequent position P2 of the flying machine 3 in FIG. 3, the antenna 6B has a direct line of sight to the satellite S2 in order to generate a link between the satellite S2 and the modem M1, as illustrated by arrows F3 and F4; and
in subsequent position P3 of the flying machine 3 in FIG. 4, the antenna 6C has a line of sight to the satellite 32 in order to generate a link between the satellite S2 and the modem M1, as illustrated by arrows F5 and F6.

In addition, in order to maintain the link between the modem M2 and at least one satellite S1A, S1B, S1C, S1D and S1E of the constellation 2:
in position P1 of the flying machine 3 in FIG. 2, the antennas 6B and 6C and the satellites S1C, S1D and S1E are used, as illustrated by arrows G1, G2, G3, G4 and G5;

in position P2 of the flying machine 3 in FIG. 3, the antennas 6A and 6C and the satellites S1A, S1B and S1E are used, as illustrated by arrows G6, G7, G8, G4 and G5; and in position P3 of the flying machine 3 in FIG. 4, the antennas 6A and 68 and the satellites S1A, S1B, S1C and S1D are used, as illustrated by arrows G6, G7, G8, G1, G2 and G3.

Over the course of the flight of the flying machine 3, the flows of information (data and commands) exchanged between the antennas and the modems are therefore adapted dynamically, with if necessary reconfiguration of the antennas, so that each modem always has available to it the antenna or antennas best suited to maintaining its connection with the satellite (or the satellite constellation) with which it is operating.

In the case of a constellation, the optimization may take into consideration the anticipation of the interruption of a link with a satellite caused by loss of direct line of sight below the horizon, and the acquisition of new satellites that have just risen above the horizon due to the combination of their own movement on their orbit and the movement of the flying machine 3.

Although it has been described in the context of a preferred application in the aviation field, mounted on a flying machine 3, the system 1 may also be applied to the terrestrial field and even to the maritime field, and in particular to trains, cars, etc., and more generally to any mobile element communicating with satellites.

Furthermore, in the aviation field, the flying machine may be a drone, a helicopter, etc., or any other type of machine or vehicle capable of flight.

Figure 5:
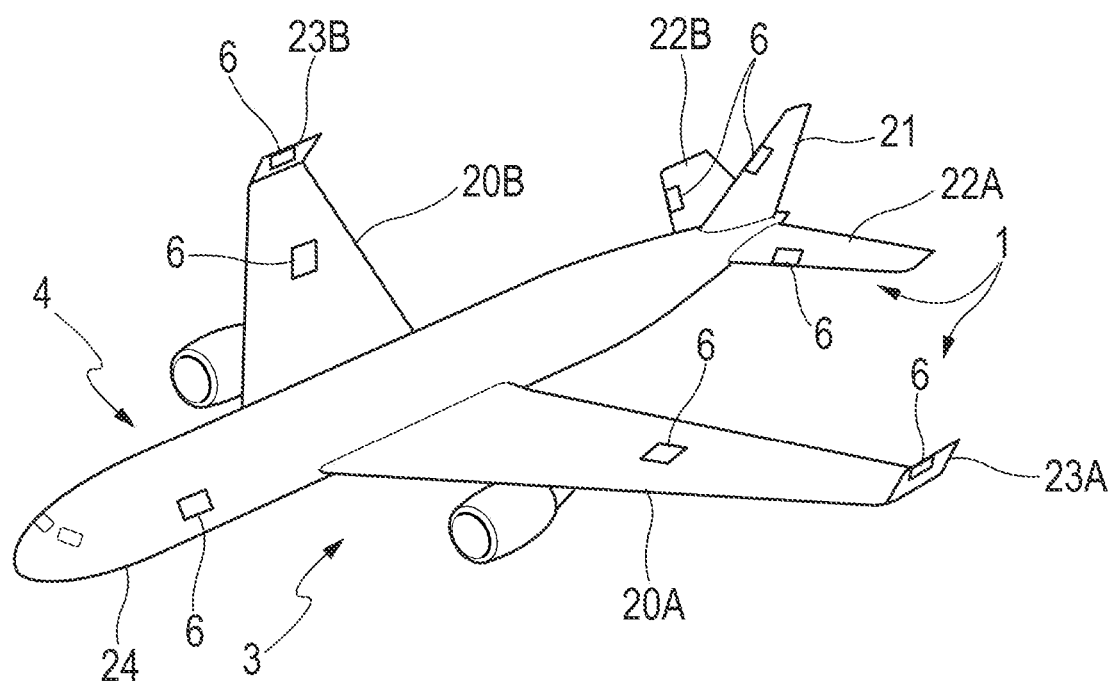
FIG. 5 schematically shows, in perspective, an airplane, equipped with a partially shown system for receiving and managing satellite signals.

In one particular application, shown in FIG. 5, the flying machine 3 equipped with the system 1 is a transport plane 4. In such an application, a sufficient number of antennas 6, in particular flat electronic-pointing antennas, are preferably arranged at various locations of the structure of the transport plane 4. These locations and the orientations of the antennas 6 are preferably chosen so as to ensure, through a combination of the coverage of each antenna 6, an overall coverage (obtained by all of the antennas 6 of the system 1) of 360° azimuth and at least between −20° and +90° elevation (with respect to a horizontal plane).

Arranging multiple antennas 6 at various locations of the airplane 4 gives the physical possibility of simultaneously establishing:

a radio link between the airplane 4 and a plurality of different satellites, for example so as to anticipate a handover between two satellites without a service interruption, as in the example of FIGS. 2 to 4;

a plurality of radio links between the airplane 4 and one and the same satellite, when this satellite appears within the field of coverage of several of the antennas, for example so as to maximize the data rates of the communication that it is desired to establish between the airplane 4 and this satellite.

In one particular embodiment, shown in FIG. 5, the system 1 comprises one or more antennas 6 that are arranged on one or more of the following elements of the airplane 4:

a wing 20A, 20B;

the tail fin 21;

a horizontal tail 22A 22B;

a winglet 23A, 23B of a wing 20A, 20B;

the fuselage 24, for example behind various windows present to the right and to the left along the fuselage 24.

The system 1 as described above has numerous advantages. In particular, the switching unit 11 makes it possible to dynamically switch data flows from a plurality of antennas to a plurality of modems so as to maintain a plurality of connections to various satellite communication services in parallel, via various constellations operating in the same frequency bands, potentially on various orbits, and to do so regardless of the movements of the flying machine 3, by dynamically reallocating the various antennas to the various modems on the basis of their instantaneous orientation, The system 1 as described above is able to implement a method PR for receiving and managing satellite signals.

Figure 6:
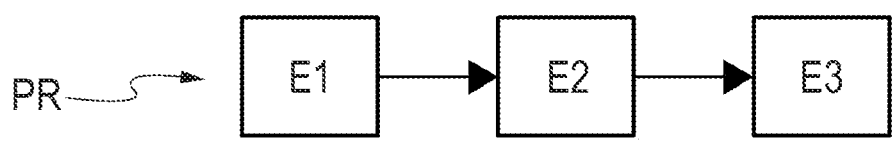
FIG. 6 schematically illustrates the steps of a method for receiving and managing satellite signals, implemented by the system of FIG. 1.

This method PR comprises, as shown in FIG. 6, a first set of steps E1 implemented by the antennas of the system 1, consisting in or comprising receiving satellite signals (in a conventional manner).

The method PR additionally comprises:

a management step E2, implemented by the controlled switching unit 11 and, where applicable, by the control unit 12 controlling it. This management step E2 consists in or comprises managing, in real time, the allocation and the transmission of data from the various antennas to the various modems, the data from any one of the antennas being able to be allocated and transmitted to any one of the modems. The allocation of the data from the various antennas to the various modems depends at least on current positions of the antennas and on satellite position information; and a second set of steps E3 implemented by the modems M1, M2 and MN of the system 1 and consisting in or comprising managing and processing, in a conventional manner, the data received by these modems M1, M2 and MN.

The management step E2 consists in or comprises adapting, in real time, the allocation and the transmission of the data from the various antennas to the various modems M1, M2 and MN such that, while the flying machine 3 is moving, each modem always receives data relating to signals transmitted by one and the same satellite (or one and the same satellite constellation) with which it is communicating.

The management step E2 furthermore also consists in or comprises allocating a modulation and demodulation function to each of the antennas, allowing it to communicate with one of the satellites (or one of the satellite constellations) adapted to the thus-allocated modulation and demodulation function.

The method PR therefore makes it possible to establish satellite communication links simultaneously to various satellites or satellite constellations, and to maintain these links dynamically by reallocating, in real time, the data flows from various antennas to various modems so as to keep enough capacity to receive from and to transmit to the various satellites (or the various constellations) to which the flying machine 3 is connected, during the course of the movement thereof.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for a flying machine for receiving and managing satellite signals, the system comprising a plurality of antennas, each of the antennas being able to receive satellite signals from satellites relating to services, the system comprising:
   a plurality of modems, each of the modems being configured to manage data received from at least one antenna of the plurality of antennas, the data being representative of signals received by the at least one antenna of the plurality of antennas, each of the modems being configured to manage service relating to a given satellite; and
   a switching unit configured to be controlled and configured to manage, in real time, on a basis of its command, at least an allocation and a transmission of the data from the antennas to the modems, the data from any one of the antennas being configured to be allocated and transmitted to any one of the modems, the allocation of the data from the antennas to the modems depending at least on current positions of the antennas and on satellite position information.

2. The system according to claim 1, comprising a control unit configured to control the switching unit.

3. The system according to claim 2, wherein the control unit is configured to control the switching unit on a basis at least of a location of the antennas on the flying machine, of current flight parameters of the flying machine and of data from a satellite database comprising at least the satellite positioning information.

4. The system according to claim 1, configured to control the switching unit collaboratively.

5. The system according claim 1, wherein the switching unit is configured to transmit, to just one and a same modem, data from a plurality of antennas receiving signals from one and the same satellite or from satellites of one and a same satellite constellation via a module that sums these data.

6. The system according to claim 1, comprising a plurality of modulation and demodulation functions adapted to each of the satellites or satellite constellations with which the system has to be configured to communicate, and at least one management element configured to allocate one of the modulation and demodulation functions of the plurality of modulation and demodulation functions to each of the antennas, allowing each of the antennas to communicate with one of the satellites or one of the satellite constellations adapted to the thus-allocated modulation and demodulation function.

7. The system according to claim 6, comprising a control unit configured to control the switching unit, and wherein the management element forms part of the control unit.

8. The system according to claim 6, wherein the management element is configured, upon a change of allocation of modulation and demodulation function to an antenna, to reconfigure the antenna for a new modulation and demodulation function.

9. The system according to claim 6, wherein the management element is configured, upon a change of allocation of modulation and demodulation function to an antenna, to notify the change to the modem intended to receive the data from this antenna, the modem being configured to reconfigure the antenna for a new modulation and demodulation function.

10. A method for receiving and managing satellite signals, comprising:
    providing a system for a flying machine for receiving and managing satellite signals, the system comprising a plurality of antennas, each of the antennas being able to receive satellite signals from satellites relating to services, the system comprising:
      a plurality of modems, each of the modems being configured to manage data received from at least one antenna of the plurality of antennas, the data being representative of signals received by the at least one antenna of the plurality of antennas, each of the modems being configured to manage service relating to a given satellite; and
      a switching unit configured to be controlled and configured to manage, in real time, on a basis of its command, at least an allocation and a transmission of the data from the antennas to the modems, the data from any one of the antennas being configured to be allocated and transmitted to any one of the modems, the allocation of the data from the antennas to the modems depending at least on current positions of the antennas and on satellite position information;
    the method comprising; a first set of steps, implemented by the antennas of the system, comprising receiving satellite signals from satellites relating to services, the method comprising:
      at least one management step comprising managing, in real time, at least the allocation and the transmission of data from the antennas to the modems of the system, the data from an antenna of the plurality of antennas being representative of signals received by the antenna of the plurality of antennas, each of the modems being configured to manage a service relating to a given satellite, the data from any one of the antennas being configured to be allocated and transmitted to any one of the modems, the allocation of the data from the antennas to the modems depending at least on current positions of the antennas and on satellite position information; and
      a second set of steps, implemented by the modems of the system, comprising managing the received data received by the modems.

11. The method according to claim 10, wherein the management step comprises adapting, in real time, the allocation and the transmission of the data from the antennas to the modems such that, while the flying machine is moving, each modem always receives data relating to signals transmitted by one and a same satellite or one and a same satellite constellation with which that modem is communicating.

12. The method according to claim 10, wherein the management step comprises allocating a modulation and demodulation function to each of the antennas, allowing each of the antennas to communicate with one of the satellites or one of the satellite constellations, adapted to the thus-allocated modulation and demodulation function.

13. A flying machine, comprising a system according to claim 1.

14. The flying machine according to claim 13, wherein the system comprises a plurality of antennas on the flying machine to generate together an overall coverage of 360° azimuth and at least between −20° and +90° elevation.

15. The flying machine according to claim 13, wherein the flying machine is an airplane, and wherein at least one of the antennas of the system is on one of following elements of the airplane:
- a wing;
- the tail fin;
- a horizontal tail;
- a wing-tip winglet;
- the fuselage.

* * * * *